US008356030B2

(12) United States Patent  
Neylon et al.

(10) Patent No.: US 8,356,030 B2
(45) Date of Patent: Jan. 15, 2013

(54) DOMAIN-SPECIFIC SENTIMENT CLASSIFICATION

(75) Inventors: Tyler J. Neylon, New York, NY (US); Kerry L. Hannan, Mountain View, CA (US); Ryan T. McDonald, MountainView, CA (US); Michael Wells, Redwood City, CA (US); Jeffrey C. Reynar, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/163,623

(22) Filed: Jun. 17, 2011

(65) Prior Publication Data

US 2011/0252036 A1    Oct. 13, 2011

Related U.S. Application Data

(63) Continuation of application No. 11/844,222, filed on Aug. 23, 2007, now Pat. No. 7,987,188.

(51) Int. Cl.
  *G06F 17/30* (2006.01)
(52) U.S. Cl. ...................................... 707/721
(58) Field of Classification Search .................. 707/721
  See application file for complete search history.

(56) References Cited

U.S. PATENT DOCUMENTS

| | | | | |
|---|---|---|---|---|
| 5,832,504 A | * | 11/1998 | Tripathi et al. | 715/235 |
| 6,226,659 B1 | * | 5/2001 | Wong et al. | 715/209 |
| 6,611,838 B1 | * | 8/2003 | Ignat et al. | 1/1 |
| 7,139,766 B2 | * | 11/2006 | Thomson et al. | 1/1 |
| 7,356,758 B1 | * | 4/2008 | Bedell et al. | 715/200 |
| 7,756,879 B2 | | 7/2010 | Parsons et al. | |
| 7,865,354 B2 | | 1/2011 | Chitrapura et al. | |
| 7,949,937 B2 | * | 5/2011 | Wu | 715/209 |
| 7,996,210 B2 | | 8/2011 | Godbole et al. | |
| 2003/0004742 A1 | * | 1/2003 | Palmer et al. | 705/1 |
| 2003/0216986 A1 | | 11/2003 | Hassan | |
| 2006/0026122 A1 | * | 2/2006 | Hurwood et al. | 707/1 |
| 2006/0048048 A1 | * | 3/2006 | Welcker et al. | 715/513 |
| 2008/0103877 A1 | | 5/2008 | Gerken | |
| 2009/0193011 A1 | | 7/2009 | Blair-Goldensohn et al. | |
| 2009/0319518 A1 | | 12/2009 | Koudas et al. | |

OTHER PUBLICATIONS

Kanayama et al., Fully Automatic Lexicon Expansion for Domain-oriented Sentiment Analysis, Proceedings of the 2006 Conference on Empirical Methods in Natural Language Processing (EMNLP 2006), pp. 355-363, Sydney, Jul. 2006.*

Turney, Thumbs Up or Thumbs Down? Semantic Orientation Applied to Unsupervised Classification of Reviews, Proceedings of the 40th Annual Meeting of the Association for Computational Linguistics (ACL), Philadelphia, Jul. 2002, pp. 417-424.*

(Continued)

*Primary Examiner* — William Spieler
(74) *Attorney, Agent, or Firm* — Middleton Reutlinger (57) ABSTRACT

A domain-specific sentiment classifier that can be used to score the polarity and magnitude of sentiment expressed by domain-specific documents is created. A domain-independent sentiment lexicon is established and a classifier uses the lexicon to score sentiment of domain-specific documents. Sets of high-sentiment documents having positive and negative polarities are identified. The n-grams within the high-sentiment documents are filtered to remove extremely common n-grams. The filtered n-grams are saved as a domain-specific sentiment lexicon and are used as features in a model. The model is trained using a set of training documents which may be manually or automatically labeled as to their overall sentiment to produce sentiment scores for the n-grams in the domain-specific sentiment lexicon. This lexicon is used by the domain-specific sentiment classifier.

30 Claims, 6 Drawing Sheets

OTHER PUBLICATIONS

Dave, K., et al. "Mining the Peanut Gallery: Opinion Extraction and Semantic Classification of Product Review" WWW, May 20-24, 2003, pp. 519-528.

Esuli, A., et al. "PageRanking WordNet Synsets: An Application to Opinion Mining" Proceedings of the 45th Annual Meeting of the Association of Computer Linguistics, Jun. 2007, pp. 424-431.

Hurst, M., et al. "Retrieving Topical Sentiments from Online Document Collections". 2004, 8 pages.

Yi, J., et al., "Sentiment Analyzer: Extracting Sentiments About a Given Topic using Natural Language Processing Techniques," Proceedings of the Third IEEE International Conference on Data Mining, 2003, 8 pages.

Kim, S-M., et al. "Identifying and Analyzing Judgment Opinions" Proceedings of the Human Language Technology Conference of the North American Chapter of the ACI, 2006, pp. 200-207.

* cited by examiner

DOMAIN-SPECIFIC SENTIMENT CLASSIFICATION

CROSS REFERENCE TO RELATED APPLICATIONS

This application is a continuation of U.S. patent application Ser. No. 11/844,222, filed Aug. 23, 2007 now U.S. Pat. No. 7,987,188, which is incorporated by reference in its entirety.

BACKGROUND OF THE INVENTION

1. Field of the Invention

This invention pertains in general to natural language processing and in particular to automated sentiment classification of documents.

2. Description of the Related Art

Sentiment classification is useful for tracking sentiment regarding particular entities such as companies, products, and people. For example, sentiment classification can be applied to information available on the Internet and/or other networks in order to obtain a general sense of how the entity is perceived. Advertisers use sentiment classification to analyze reviews, blogs, forum discussions, and newsgroup posts and judge how an advertised product is perceived by the public. In addition, sentiment classification can also assist web searchers seeking information about an entity by summarizing the sentiment for the entity.

Sentiment is generally measured as being positive, negative, or neutral (i.e., the sentiment is unable to be determined). A common way to perform sentiment classification is to identify positive and negative words occurring in a document and use those words to calculate a score indicating the overall sentiment expressed by the document. A problem with this approach is that it does not account for the sentiment expressed by domain-specific words. For example the word "small" usually indicates positive sentiment when describing a portable electronic device, but can indicate negative sentiment when used to describe the size of a portion served by a restaurant. Thus, words that are positive in one domain can be negative in another. Moreover, words which are relevant in one domain may not be relevant in another domain. For example, "battery life" may be a key concept in the domain of portable music players but be irrelevant in the domain of restaurants. This lack of equivalence in different domains makes it difficult to perform sentiment classification across multiple domains.

BRIEF SUMMARY OF THE INVENTION

The above and other difficulties are overcome by a method, system, and computer program product for constructing a domain-specific sentiment classifier for classifying sentiment expressed by documents in a specified domain. Embodiments of the method comprise scoring sentiments expressed by a plurality of domain-specific documents responsive to a domain-independent sentiment lexicon and identifying a set of high-sentiment documents responsive to the scoring. Embodiments of the method further comprise creating a domain-specific sentiment lexicon based at least in part on the set of high-sentiment documents, generating the domain-specific sentiment classifier responsive to the domain-specific sentiment lexicon, and storing the domain-specific sentiment classifier.

Embodiments of the system and computer program product comprise a scoring module configured to score sentiments expressed by a plurality of domain-specific documents responsive to a domain-independent sentiment lexicon and an analysis module configured to identify a set of high-sentiment documents responsive to the scoring. Embodiments of the system and computer program product further comprise a lexicon module configured to create a domain-specific sentiment lexicon based at least in part on the set of high-sentiment documents, a classifier module configured to generate the domain-specific sentiment classifier responsive to the domain-specific sentiment lexicon, and a storing module configured to store the domain-specific sentiment classifier.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

I. Overview

Figure 1:
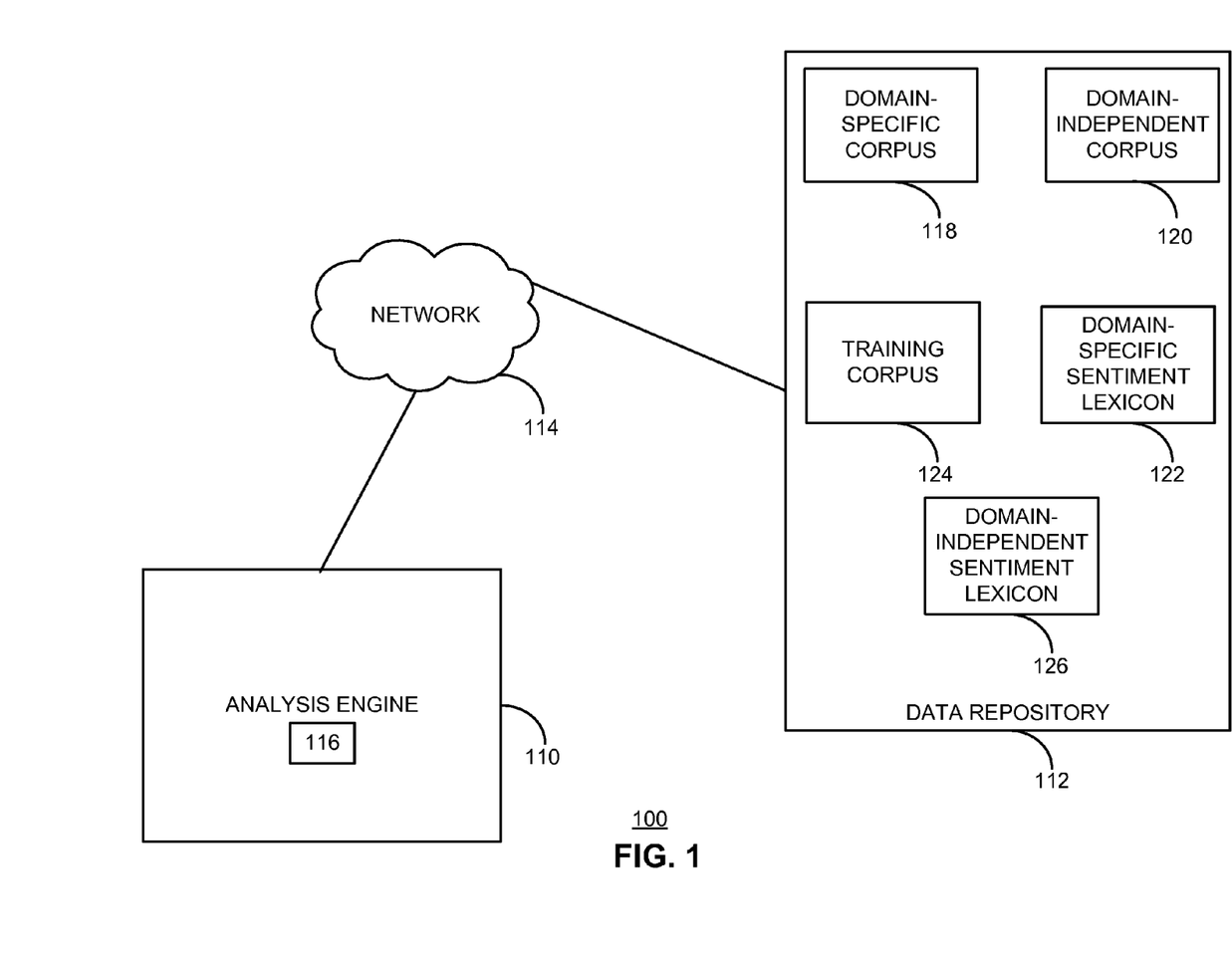
FIG. 1 is a high-level block diagram of a computing environment according to one embodiment of the present invention.

FIG. 1 is a high-level block diagram of a computing environment 100 according to one embodiment. FIG. 1 illustrates an analysis engine 110 and a data repository 112 connected to a network 114. Although FIG. 1 illustrates only a single analysis engine 110, embodiments can have multiple engines. Likewise, there can be multiple data repositories on the network 114. Only one of each entity is illustrated in order to simplify and clarify the present description. There can be other entities on the network 114 as well. In some embodiments, the analysis engine 110 and data repository 112 are combined into a single entity.

The analysis engine 110 supports domain-specific sentiment classification for documents stored in the repository 112 and/or other locations. In one embodiment, the analysis engine 110 uses the documents in the repository 112 to identify a domain-specific sentiment lexicon 122 of n-grams. In addition, the analysis engine 110 uses the n-grams in the domain-specific sentiment lexicon 122 as features in a model in order to build a highly-accurate domain-specific sentiment classifier 116. The analysis engine 110 uses the classifier 116 to classify the sentiment of documents stored in the repository 112 and/or on the network 114. In one embodiment, the analysis engine 110 is controlled by an administrator or other user who uses it to build the classifier 116 and/or perform automated sentiment classification of documents.

The data repository 112 stores documents and other data utilized by the analysis engine 110 to build a domain-specific sentiment classifier 116. In one embodiment, the data repository stores sets of documents organized into various corpora. The corpora include a domain-specific corpus 118 holding domain-specific documents and a domain-independent corpus 120 holding domain-independent (i.e., non-specific) documents. In one embodiment, the domain-specific corpus 118 contains enough documents to constitute a representative sample of how sentiment is expressed in the domain Likewise, the domain-independent corpus 120 contains enough documents to constitute a representative sample of how sentiment is expressed generally, exclusive of any specific domain.

As used herein, the term "domain" refers to a particular sphere of activity, concern or function, such as restaurants, electronic devices, international business, and movies. The term "domain" does not necessarily refer to Internet domain names, although certain web sites at certain Internet domains might include documents related to a particular sphere of activity, concern or function.

In one embodiment, both corpora hold documents obtained via the network 114. The documents include web pages and/or portions of web pages, the text of books, newspapers, and magazines, emails, newsgroup postings, and/or other electronic messages, etc. For example, the documents in the domain-specific corpus 118 can include documents related to restaurants, such as portions of web pages retrieved from web sites specializing in discussions about restaurants. Likewise, the domain-specific documents in the corpus 118 can include web pages retrieved from web sites that include reviews and/or discussion related to portable electronic devices, such as mobile telephones and music players. In contrast, the documents in the domain-independent corpus 120 can include documents associated with a variety of different domains, so that no single domain predominates. In addition, the documents in the domain-independent corpus 120 can be drawn from sources unrelated to any particular source, such as general interest magazines or other periodicals.

In some embodiments, the corpora hold documents obtained from sources other than the network 114. Moreover, in some embodiments the corpora are virtual in the sense that they are not stored at a single location. For example, the domain-specific corpus can be defined as the contents of one or more web sites devoted to restaurant reviews or other topics.

In one embodiment, the data repository 112 also includes the domain-specific sentiment lexicon 122 and a domain-independent sentiment lexicon 126. The domain-specific sentiment lexicon 122 contains a set of n-grams (i.e., words and/or phrases) that express sentiment in a particular domain. The domain-independent sentiment lexicon 126, in contrast, contains a set of n-grams that express sentiment in a general or non-specific domain. In one embodiment, each n-gram in the lexicons 122, 126 has an associated score indicating the polarity (i.e., positive or negative) and magnitude of the sentiment it expresses.

In one embodiment, the domain-independent sentiment lexicon 126 is based on a lexical database, such as the WordNet electronic lexical database available from Princeton University of Princeton, N.J. The lexical database describes mappings between related words. That is, the database describes synonym, antonym, and other types of relationships among the words. In one embodiment, the administrator selects initial terms for the domain-independent sentiment lexicon 126 by reviewing the lexical database and manually selecting and scoring words expressing high sentiment. The administrator initially selects about 360 such words in one embodiment although the number of words can vary in other embodiments. This initial set of words is expanded through an automated process to include synonyms and antonyms referenced in the lexical database. The expanded set of words constitutes the domain-independent sentiment lexicon 126.

An embodiment of the data repository 112 also includes a training corpus 124. In one embodiment, the training corpus 124 includes domain-specific documents labeled with corresponding sentiment scores. In some embodiments the domain-specific documents are manually labeled with sentiment scores. For example, in one embodiment the documents in the training corpus 124 are drawn from popular product review web sites such as Amazon, CitySearch, and Cnet. These sites include textual product reviews that are manually labeled by the review submitters with corresponding numeric or alphabetic scores (e.g., 4 out of 5 stars or a grade of "B-"). Further, in some embodiments the domain-specific documents are automatically labeled with sentiment scores. For example, in one embodiment the documents in the training corpus 124 include high-sentiment documents from the domain specific corpus 118 that are labeled with sentiment scores through an automated process as described below.

The network 114 represents the communication pathways among the analysis engine 110, the data repository 112, and any other entities connected to the network. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include multiprotocol label switching (MPLS), the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 114 can be represented using technologies and/or formats including the HTML, the extensible markup language (XML), the Extensible Hypertext markup Language (XHTML), the compact HTML (cHTML), etc. In addition, all or some of links can be encrypted using conventional encryption technologies such as the secure sockets layer (SSL), HTTP over SSL (HTTPS), and/or virtual private networks (VPNs). In other embodiments, the analysis engine 110 and data repository 112 use custom and/or dedicated data communications technologies instead of, or in addition to, the ones described above.

II. System Architecture

Figure 2:
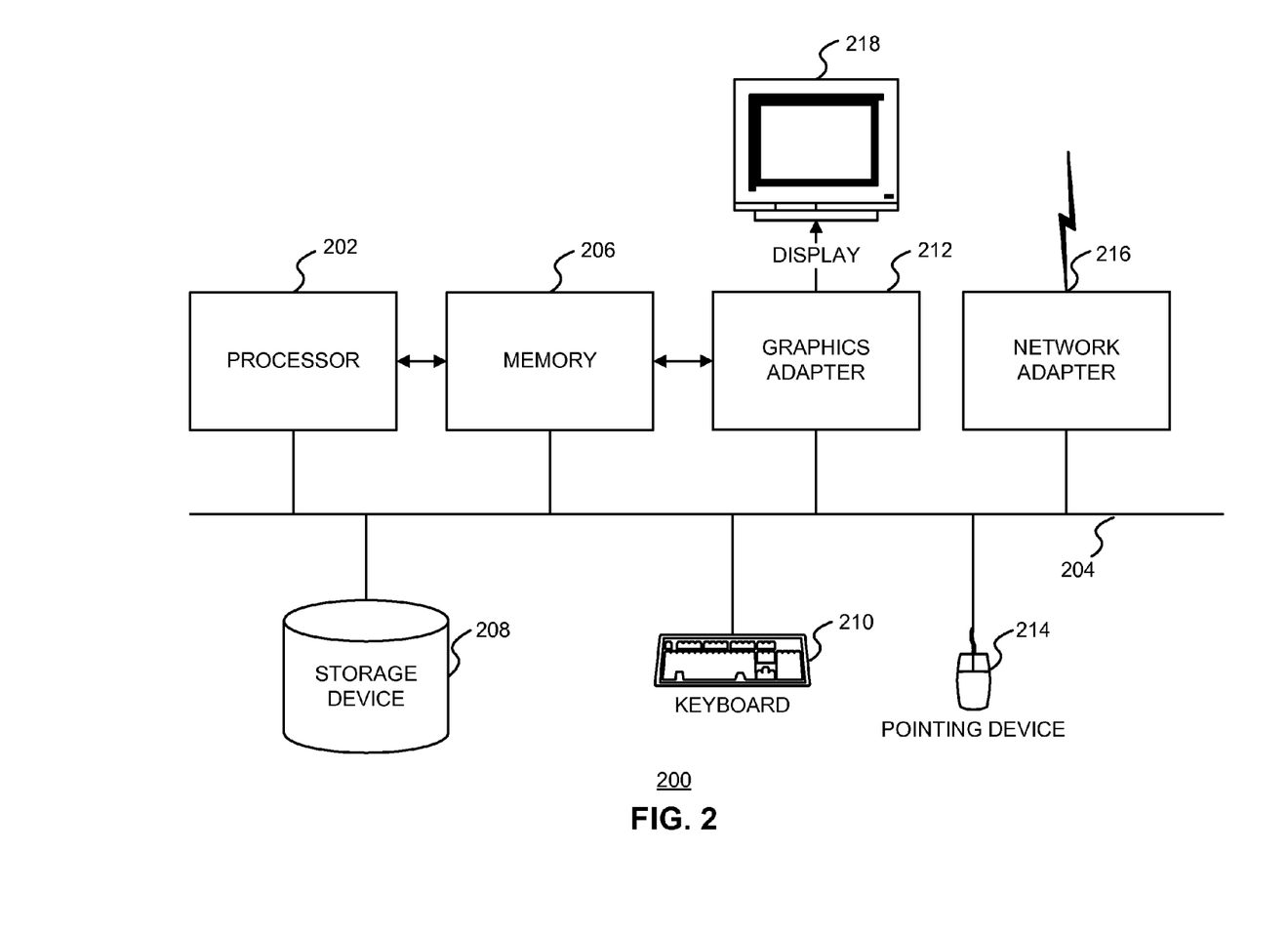
FIG. 2 is a high-level block diagram illustrating a functional view of a typical computer for use as the analysis engine and/or data repository illustrated in the environment of FIG. 1 according to one embodiment.

FIG. 2 is a high-level block diagram illustrating a functional view of a typical computer 200 for use as the analysis engine 110 and/or data repository 112 illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 used by the entities of FIG. 1 can vary depending upon the embodiment and the processing power required by the entity. The analysis engine 110 can include one or more distributed physical or logical computers operating together to provide the functionalities described herein. Likewise, the data repository can be provided by a storage area network (SAN), database management system (DBMS), or another storage system. The computers 200 can lack some of the components described above, such as keyboards 210, graphics adapters 212, and displays 218.

Figure 3:
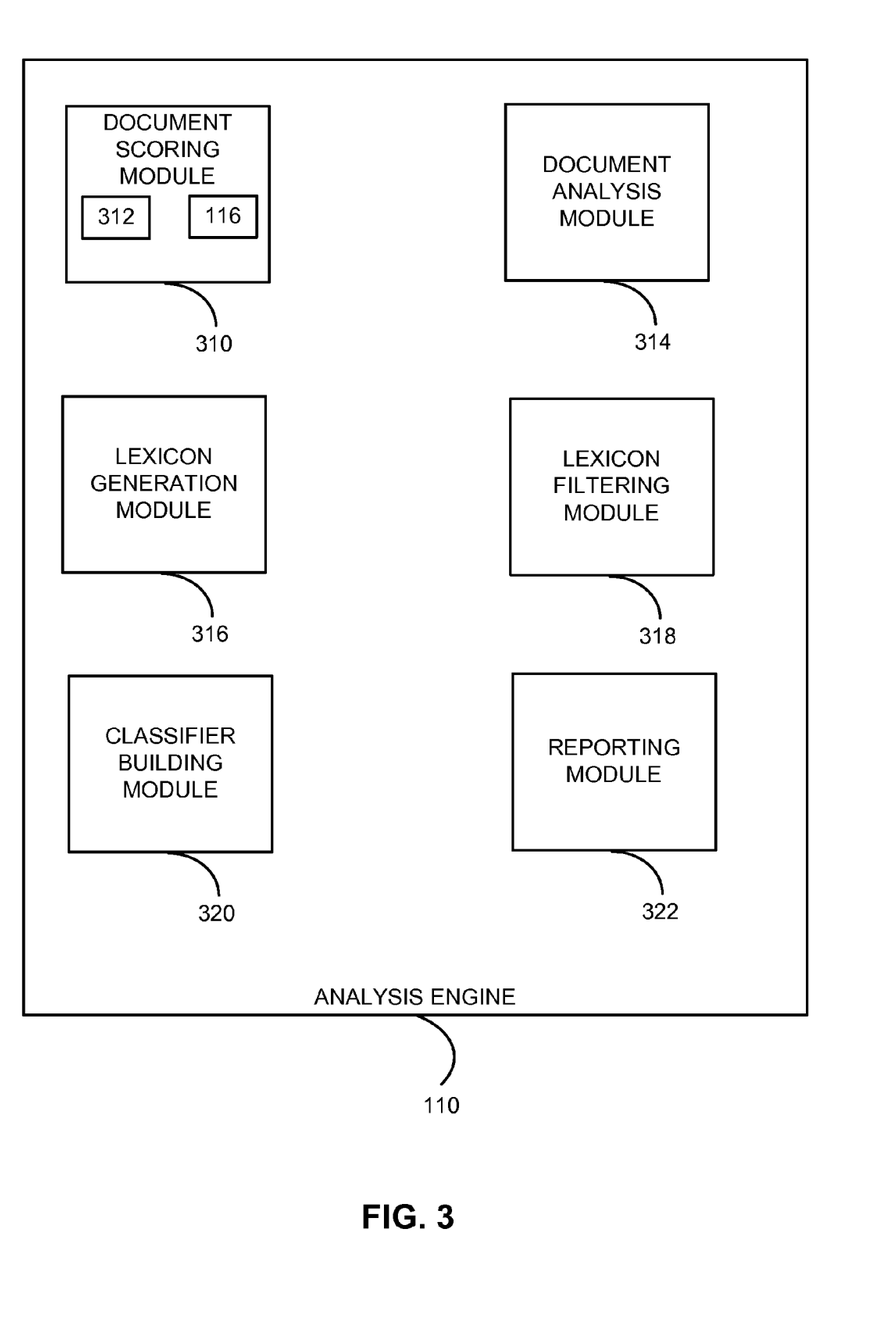
FIG. 3 is a high-level block diagram illustrating modules within the analysis engine according to one embodiment.

FIG. 3 is a high-level block diagram illustrating modules within the analysis engine 110 according to one embodiment. Other embodiments have different and/or additional modules than the ones shown in FIG. 3. Moreover, other embodiments distribute the functionalities among the modules in a different manner.

A document scoring module 310 scores documents to determine the magnitude and polarity of the sentiment they express. In one embodiment, the document scoring module 310 includes one or more classifiers. These classifiers include a lexicon-based classifier 312 and the domain-specific classifier 116 created by the analysis engine 110.

An embodiment of the lexicon-based classifier 312 uses the domain-independent sentiment lexicon 126 to calculate sentiment scores for documents in the domain-specific corpus 118. The scoring performed by the lexicon-based classifier 312 essentially looks for n-grams from the domain-independent lexicon 126 that occur in the documents of the corpus 118. For each n-gram that is found, the classifier 312 determines a score for that n-gram based on the techniques/factors described below. The sentiment score for the document is the sum of the scores of the n-grams occurring within it.

Embodiments of the lexicon-based classifier 312 use one or more of the following techniques/factors to determine the score for an n-gram found in a document:

the n-gram score in the lexicon: An n-gram in the lexicon 126 has an associated score representing the polarity and magnitude of the sentiment it expresses. For example, "hate" and "dislike" both have negative polarities, and "hate" has a greater magnitude than "dislike."

part-of-speech tagging: The part of speech that an n-gram represents is classified and a score is assigned based on the classification. For example, the word "model" can be an adjective, noun or verb. When used as an adjective, "model" has a positive polarity (e.g., "he was a model student"). In contrast, when "model" is used as a noun or verb, the word is neutral with respect to sentiment.

negation detection: An n-gram that normally connotes one type of sentiment can be used in a negative manner. For example, the phrase "This meal was not good" inverts the normally-positive sentiment connoted by "good."

location in document: A score is influenced by where the n-gram occurs in the document. In one embodiment, n-grams are scored higher if they occur near the beginning or end of a document because these portions are more likely to contain summaries that concisely describe the sentiment described by the remainder of the document.

stemming: Reverse conjugation of a word in an n-gram is performed in order to identify its root word. A score is assigned to the word based on its root.

A document analysis module 314 analyzes documents scored by the document scoring module 310. In one embodiment, the document analysis module 314 analyzes the documents scored by the lexicon-based classifier 312 and isolates the highest-scoring documents. An embodiment of the module 314 uses two scoring thresholds to partition the documents into a set of documents that express very negative sentiment and a set of documents that express very positive sentiment. Thus, documents that have a sentiment score lower than the negative sentiment threshold are placed in the "very negative sentiment" set while documents that have a sentiment score higher than the positive sentiment threshold are placed in the "very positive sentiment" set. Documents falling in the middle range are ignored for purposes of this analysis.

A lexicon generation module 316 creates the domain-specific lexicon 122 based on the sets of high-sentiment documents isolated by the document analysis module 314. The lexicon generation module 316 identifies all n-grams up to a predetermined value of 'n' that occur in the documents in each set. "N" is five in one embodiment. Further, the lexicon generation module 316 identifies the most frequently occurring n-grams in each of the high-sentiment document sets (i.e., the most frequently occurring n-grams from the very negative sentiment document set and the most frequently occurring n-grams from the very positive sentiment document set).

A lexicon filtering module 318 filters the n-grams produced by the lexicon generation module 316 to produce a set of domain-specific sentiment-expressing n-grams. In one embodiment, the filtering module 318 removes extremely common n-grams (i.e., stop words) from the very negative and very positive sets. This filtering removes words and phrases like "the," "or," "he," and "she" that are unlikely to express sentiment. The n-grams that remain after filtering constitute the domain-specific sentiment lexicon 122.

A classifier building module 320 builds the domain-specific classifier 116 used by the document scoring module 310. In one embodiment, the classifier building module 320 assigns a score to each n-gram in the domain-specific sentiment lexicon 122 that represents the polarity and magnitude of the sentiment it expresses. The domain-specific classifier 116 uses the n-gram scores in the domain-specific sentiment lexicon 122, along with the techniques and factors described above with respect to the lexicon-based classifier 312, to classify the sentiment expressed by domain-specific documents.

To assign the scores to the n-grams in the domain-specific sentiment lexicon 122, the classifier building module 320 uses the n-grams as feature in a model, such as a maximum entropy model, and trains the model on documents. Other models used in some embodiments to assign sentiment scores to the n-grams are based on support vector machines, Naïve Bayes, perceptron, Winnow, and LASSO (Least Absolute Shrinkage and Selection Operator) instead of, or in addition to, maximum entropy.

In one embodiment, the classifier building module 320 trains the model on the labeled documents in the training corpus 124. Recall that in one embodiment the documents in the training corpus 124 include documents with manually-labeled sentiment scores. In other embodiments, the documents in the training corpus 124 include the set of high-sentiment documents having the scores assigned by the document scoring module 310 and isolated by the document analysis module 314 via the automated process described above. The set of high-sentiment documents can be used, for example, if obtaining the manually-labeled documents is too expensive or difficult, or if there are not enough manually-labeled documents available. Some embodiments train on both manually- and automatically-labeled documents. The training assigns accurate sentiment scores to the n-grams in the domain-specific lexicon 122.

A reporting module 322 reports results of operations performed by the analysis engine 110. The reports can include generating a presentation on the display of a computer, storing data in a log file describing the operations performed, storing data resulting from the operations performed by the analysis engine in the repository 112 or elsewhere, and the like. For example, the reporting module 322 can save the output of the lexicon filtering module 318 in the repository 112 as the domain-specific sentiment lexicon 122. Likewise, the reporting module 322 can store the sentiment scores for the n-grams in the filtered high-sentiment n-gram set generated by the classifier building module 320, and sentiment scores for documents generated by the domain-specific classifier 116, in the data repository 112 or elsewhere.

III. Process

Figure 4:
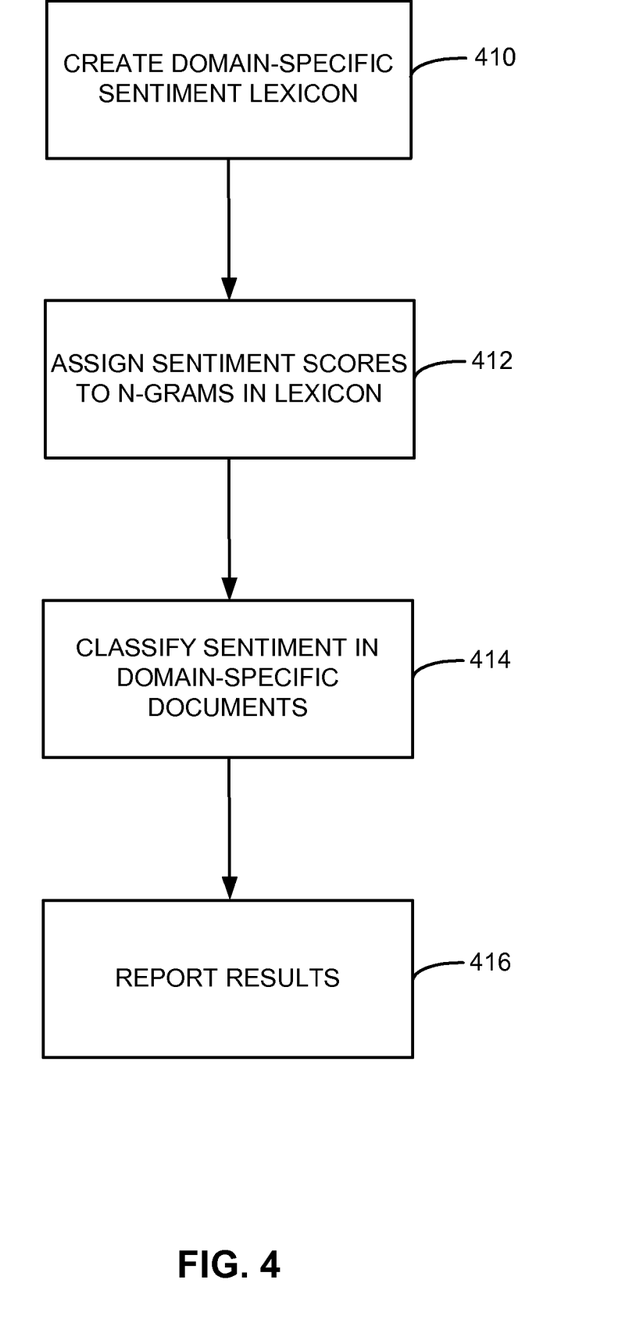
FIG. 4 is a flowchart illustrating steps performed by the analysis engine to generate a domain-specific classifier and apply the classifier to a set of domain-specific documents according to one embodiment.

FIG. 4 is a flowchart illustrating steps performed by the analysis engine 110 to build the domain-specific classifier 116 and apply the classifier to a set of domain-specific documents according to one embodiment. Other embodiments perform additional and/or different steps that the ones described in the figure. In addition, other embodiments perform the steps in different orders and/or perform multiple steps concurrently. Certain embodiments perform only some of the steps, such as only the steps directed to building the classifier 116.

The analysis engine 110 creates 410 a domain-specific lexicon 122 and saves it in the data repository 112. The analysis engine 110 uses the training corpus 124 to associate 412 sentiment scores with the n-grams in the lexicon 122. The n-grams and associated scores are used by the domain-specific classifier 116. In one embodiment, the analysis engine 110 uses the domain-specific classifier 116 to classify 414 sentiment in domain-specific documents. The analysis engine 110 reports 416 the results of the classifications. The report can be used to track the sentiment of an entity within the specific domain, to influence rankings of search results, and/or for other purposes.

Figure 5:
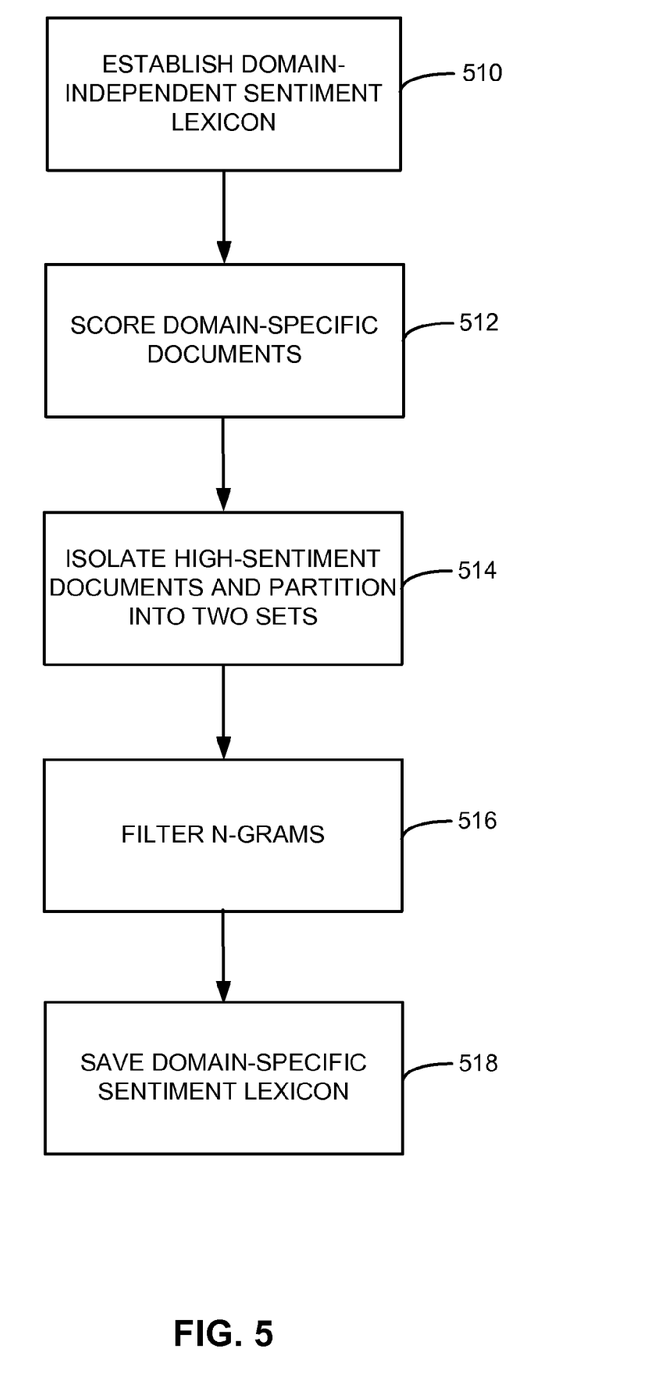
FIG. 5 is a flowchart illustrating a more detailed view of steps performed by an embodiment of the analysis engine in creating the domain-specific sentiment lexicon as illustrated in step 410 of FIG. 4.

FIG. 5 is a flowchart illustrating a more detailed view of steps performed by an embodiment of the analysis engine 110 in creating the domain-specific sentiment lexicon as illustrated in step 410 of FIG. 4. Other embodiments perform additional and/or different steps than the ones described in the figure. In addition, other embodiments perform the steps in different orders and/or perform multiple steps concurrently.

The analysis engine 110 establishes 510 a domain-independent sentiment lexicon 126. As described above, in one embodiment this lexicon 126 is created by manually selecting words having high sentiment from a lexical database and identifying antonyms and synonyms of the selected words. The selected words, antonyms, and synonyms are included in the domain-independent sentiment lexicon 126. Other embodiments use a pre-defined domain-independent sentiment lexicon or use other techniques to create the lexicon.

The analysis engine 110 uses the domain-independent sentiment lexicon 126 to score 512 sentiment of documents in a domain-specific corpus 118. Then, the analysis engine 110 isolates the high-sentiment documents and partitions 514 those documents into a set of very negative sentiment documents and a set of very positive sentiment documents. The analysis engine 110 extracts n-grams from the negative- and positive-sentiment documents. These n-grams are filtered 516 to remove extremely common words and phrases. The remaining n-grams are saved 518 as a domain-specific sentiment lexicon 122.

Figure 6:
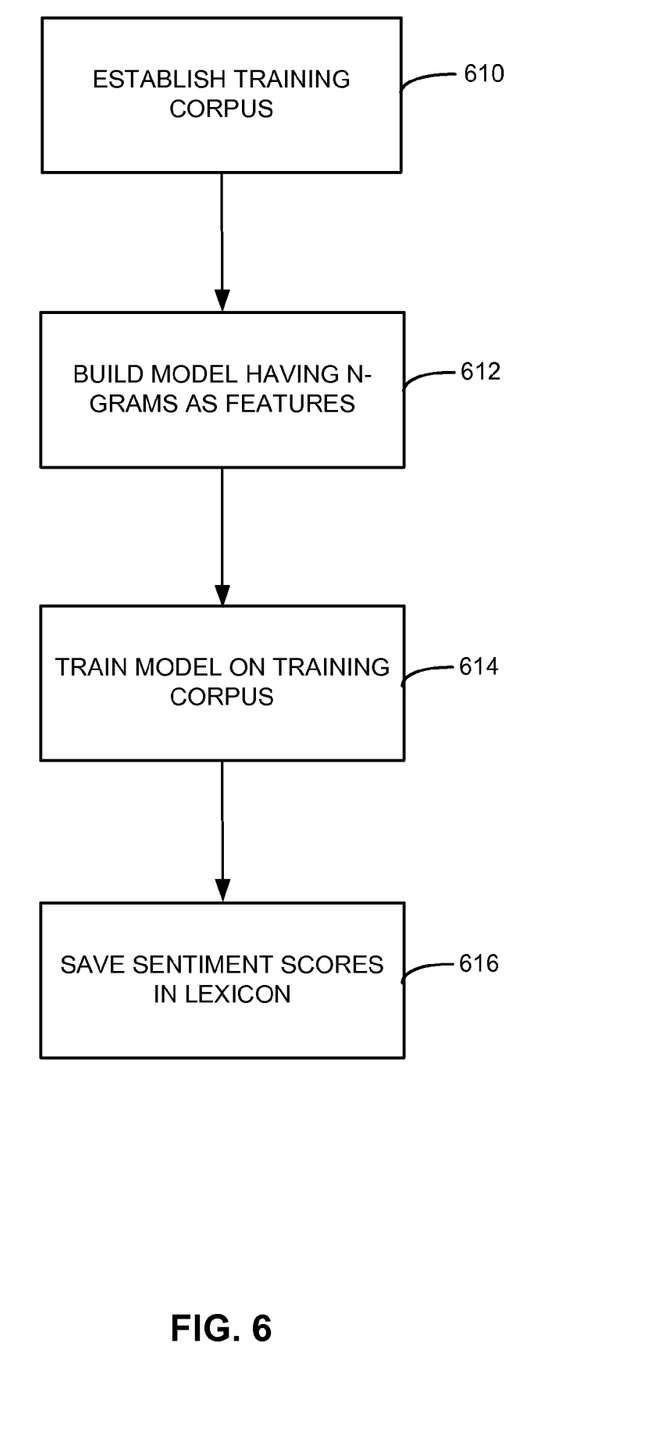
FIG. 6 is a flowchart illustrating a more detailed view of steps performed by an embodiment of the analysis engine in assigning weights to n-grams in the domain-specific sentiment lexicon as illustrated in step 412 of FIG. 4.

FIG. 6 is a flowchart illustrating a more detailed view of steps performed by an embodiment of the analysis engine 110 in assigning sentiment scores to n-grams in the domain-specific sentiment lexicon 122 as illustrated in step 412 of FIG. 4. Other embodiments perform additional and/or different steps than the ones described in the figure. In addition, other embodiments perform the steps in different orders and/or perform multiple steps concurrently.

The analysis engine 110 establishes 610 a training corpus 124 of labeled documents. As described above, in some embodiments the training corpus 124 is established by collecting domain-specific documents that are manually labeled with sentiment scores while in other embodiments the training corpus 124 is established using the automatically-labeled set of high-sentiment documents isolated by the document analysis module 314. The analysis engine 110 builds 612 a model, such as a maximum entropy model, having the n-grams of the domain-specific sentiment lexicon 122 as features. The model is trained 614 on the labeled documents in the training corpus 124 to determine sentiment scores for the n-grams. These scores are saved 616 in the domain-specific sentiment lexicon 122.

Those of skill in the art will recognize that the techniques described herein can be used to build multiple sentiment classifiers for documents in different domains. To this end, some embodiments have multiple domain-specific lexicons, domain-specific corpora, and training corpora. This description refers to a single domain-specific classifier 116 and domain for purposes of clarity.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of constructing a domain-specific sentiment classifier for classifying sentiment expressed by documents in a specified domain, comprising:
   scoring sentiments expressed by one or more domain-specific documents, the scoring comprising:
      determining that one or more of the domain-specific documents include an n-gram,
      calculating a score for the n-gram included in the one or more domain-specific documents, and
      calculating a sentiment score for the one or more domain-specific documents based on the score for the n-gram included in the documents;
   creating a domain-specific sentiment lexicon based at least in part on said scoring sentiments expressed by one or more domain-specific documents;
   generating the domain-specific sentiment classifier based on the domain-specific sentiment lexicon; and
   storing the domain-specific sentiment classifier.

2. The method of claim 1, wherein scoring sentiments expressed by one or more domain-specific documents is based on a domain-independent sentiment lexicon, the method further comprising:
    establishing the domain-independent sentiment lexicon by specifying a magnitude and polarity of sentiment expressed by each of a plurality of n-grams drawn from a domain-independent source.

3. The method of claim 1, wherein scoring sentiments expressed by one or more domain-specific documents is based on a domain-independent sentiment lexicon, the domain-independent sentiment lexicon specifies a magnitude and polarity of sentiment expressed by each of a plurality of n-grams, and wherein scoring sentiment expressed by one or more of the domain-specific documents based on a domain-independent sentiment lexicon comprises:
    determining whether the n-gram included in the one or more documents is in the domain-independent sentiment lexicon.

4. The method of claim 3, wherein the score calculated for the n-gram included in the one or more documents is calculated based on one or more factors/techniques from the set consisting of:
    a score for the n-gram specified in the domain-independent sentiment lexicon; part-of-speech tagging based on a part-of-speech represented by the n-gram within the documents;
    detecting whether the n-gram is used in a negative manner within the documents;
    a location of the n-gram in the documents; and
    stemming to identify a root of an n-gram in the documents.

5. The method of claim 1, further comprising:
    identifying a set of high-sentiment documents based on scoring sentiments expressed by one or more domain-specific documents;
    wherein creating a domain-specific sentiment lexicon is based at least in part on the set of high sentiment documents.

6. The method of claim 5, wherein identifying the set of high-sentiment documents based on scoring sentiments expressed by one or more domain-specific documents comprises:
    identifying a set of high-positive-sentiment documents; and
    identifying a set of high-negative-sentiment documents.

7. The method of claim 1, further comprises:
    identifying a set of high-sentiment documents based on scoring sentiments expressed by one or more domain-specific documents;
    wherein creating the domain-specific sentiment lexicon comprises:
    identifying n-grams occurring within the documents in the set of high-sentiment documents;
    filtering the identified n-grams to remove n-grams unlikely to express sentiment in the specific specified domain; and
    storing the filtered n-grams as the domain-specific sentiment lexicon.

8. The method of claim 1, wherein generating the domain-specific sentiment classifier based on the domain-specific sentiment lexicon comprises:
    building a model having n-grams of the domain-specific sentiment lexicon as features; and
    training the model on a training corpus having a set of high-sentiment documents.

9. The method of claim 1, wherein generating the domain-specific sentiment classifier based on the domain-specific sentiment lexicon comprises:
    building a model having n-grams of the domain-specific sentiment lexicon as features; and
    training the model on a training corpus having domain-specific documents having manually-labeled sentiment scores.

10. The method of claim 9, wherein the model comprises a maximum entropy model.

11. The method of claim 9, wherein the training generates sentiment scores for the n-grams of the domain-specific sentiment lexicon and further comprising:
    storing the sentiment scores for the n-grams of the domain-specific sentiment lexicon with the domain-specific sentiment lexicon.

12. The method of claim 1, further comprising:
    using the domain-specific sentiment classifier to score a magnitude and polarity of sentiment expressed by a document in the specified domain.

13. A system for constructing a domain-specific sentiment classifier for classifying sentiment expressed by documents in a specified domain, comprising:
    a non-transitory computer readable storage medium storing computer-executable instructions, the computer executable instructions comprising:
    a scoring module configured to score sentiments expressed by one or more domain-specific documents, the scoring module configured to score by performing steps comprising:
    determining that one or more of the domain-specific documents include an n-gram,
    calculating a score for the n-gram included in the one or more domain-specific documents, and
    calculating a sentiment score for the one or more domain-specific documents based on the score for the n-gram included in the documents;
    a lexicon module configured to create a domain-specific sentiment lexicon based at least in part on said scoring sentiments expressed by one or more domain-specific documents;
    a classifier module configured to generate the domain-specific sentiment classifier based on the domain-specific sentiment lexicon; and
    a storing module configured to store the domain-specific sentiment classifier.

14. The system of claim 13, wherein scoring sentiments expressed by one or more domain-specific documents is based on a domain-independent sentiment lexicon, the domain-independent sentiment lexicon specifies a magnitude and polarity of sentiment expressed by each of a plurality of n-grams, and the scoring module is further configured to:
    determine whether the n-gram included in the one or more documents is in the domain-independent sentiment lexicon.

15. The system of claim 13, further comprising:
    an analysis module configured to identify a set of high-sentiment documents based on scoring sentiments expressed by one or more domain-specific documents;
    wherein the lexicon module is configured to create the domain-specific sentiment lexicon based at least in part on the set of high-sentiment documents.

16. The system of claim 15, wherein the lexicon module is further configured to:
    identify n-grams occurring within the documents in the set of high-sentiment documents;

filter the identified n-grams to remove n-grams unlikely to express sentiment in the specified domain; and
store the filtered n-grams as the domain-specific sentiment lexicon.

17. The system of claim 13, wherein the classifier module is further configured to:
build a model having n-grams of the domain-specific sentiment lexicon as features; and
train the model on a training corpus having a set of high-sentiment documents.

18. The system of claim 13, wherein the classifier module is further configured to:
build a model having n-grams of the domain-specific sentiment lexicon as features; and
train the model on a training corpus having domain-specific documents having manually-labeled sentiment scores.

19. The system of claim 18, wherein the model comprises a maximum entropy model.

20. The system of claim 18, wherein the training generates sentiment scores for the n-grams of the domain-specific sentiment lexicon and wherein the storing module is further configured to:
store the sentiment scores for the n-grams of the domain-specific sentiment lexicon with the domain-specific sentiment lexicon.

21. The system of claim 13, wherein the scoring module is further configured to:
score a magnitude and polarity of sentiment expressed by a document in the specified domain using the domain-specific sentiment classifier.

22. A computer program product having a computer-readable storage medium having computer-executable code for constructing a domain-specific sentiment classifier for classifying sentiment expressed by documents in a specified domain, the computer-executable code comprising:
a scoring module configured to score sentiments expressed by a plurality of domain-specific documents, the scoring module configured to score by performing steps comprising:
determining that one or more of the domain-specific documents include an n-gram,
calculating a score for the n-gram included in the one or more domain-specific documents, and
calculating a sentiment score for the one or more domain-specific documents based on the score for the n-gram included in the documents;
a lexicon module configured to create a domain-specific sentiment lexicon based at least in part on said scoring sentiments expressed by one or more domain-specific documents;
a classifier module configured to generate the domain-specific sentiment classifier based on the domain-specific sentiment lexicon; and
a storing module configured to store the domain-specific sentiment classifier.

23. The computer program product of claim 22, wherein scoring sentiments expressed by one or more domain-specific documents is based on a domain-independent sentiment lexicon, the domain-independent sentiment lexicon specifies a magnitude and polarity of sentiment expressed by each of a plurality of n-grams, and the scoring module is further configured to:
determine whether the n-gram included in the one or more documents is in the domain-independent sentiment lexicon.

24. The computer program product of claim 22, further comprising:
an analysis module configured to identify a set of high-sentiment documents based on scoring sentiments expressed by one or more domain-specific documents;
wherein the lexicon module is configured to create the domain-specific sentiment lexicon based at least in part on the set of high-sentiment documents.

25. The computer program product of claim 24, wherein the lexicon module is further configured to:
identify n-grams occurring within the documents in the set of high-sentiment documents;
filter the identified n-grams to remove n-grams unlikely to express sentiment in the specified domain; and
store the filtered n-grams as the domain-specific sentiment lexicon.

26. The computer program product of claim 22, wherein the classifier module is further configured to:
build a model having n-grams of the domain-specific sentiment lexicon as features; and
train the model on a training corpus having a set of high-sentiment documents.

27. The computer program product of claim 22, wherein the classifier module is further configured to:
build a model having n-grams of the domain-specific sentiment lexicon as features; and
train the model on a training corpus having domain-specific documents having manually-labeled sentiment scores.

28. The computer program product of claim 27, wherein the model comprises a maximum entropy model.

29. The computer program product of claim 27, wherein the training generates sentiment scores for the n-grams of the domain-specific sentiment lexicon and wherein the storing module is further configured to:
store the sentiment scores for the n-grams of the domain-specific sentiment lexicon with the domain-specific sentiment lexicon.

30. The computer program product of claim 22, wherein the scoring module is further configured to:
score a magnitude and polarity of sentiment expressed by a document in the specified domain using the domain-specific sentiment classifier.

* * * * *